United States Patent [19]

Kendall et al.

[11] Patent Number: 5,205,308
[45] Date of Patent: Apr. 27, 1993

[54] PROTECTION APPARATUS FOR INFANTS

[76] Inventors: Gloria B. Kendall, 15727 Elmbrook, La Mirada, Calif. 90638; Henry M. Hernandez, 13267 Sonrisa Dr., Chino Hills, Calif. 91709

[21] Appl. No.: 754,006

[22] Filed: Sep. 3, 1991

[51] Int. Cl.5 .......................................... E04H 15/04
[52] U.S. Cl. ........................................ 135/90; 135/96; 135/97; 297/184
[58] Field of Search .................. 135/90, 95, 96, 97; 297/184; 296/97.21; 160/210, 351

[56] References Cited

U.S. PATENT DOCUMENTS

| 1,746,833 | 2/1930 | Hermansen | 135/90 X |
| 2,118,198 | 5/1938 | Hathaway | 160/210 X |
| 2,747,653 | 5/1956 | Obradovich | 135/90 X |
| 3,258,291 | 6/1966 | Ezquerra | 297/184 X |
| 3,339,566 | 9/1967 | Bowden | 135/81 |
| 3,404,915 | 10/1968 | Filho | 297/184 X |
| 4,293,162 | 10/1981 | Pap et al. | 135/90 X |
| 4,784,433 | 11/1988 | Purnell-Ayres | 297/184 |
| 5,067,770 | 11/1991 | Hassell, Jr. | 297/184 |
| 5,096,257 | 3/1992 | Clarke | 297/184 |

Primary Examiner—Carl D. Friedman
Assistant Examiner—Lan M. Mai
Attorney, Agent, or Firm—William W. Haefliger

[57] ABSTRACT

An apparatus for protecting an infant in a forwardly facing infant's seat in a vehicle from direct exposure to sun rays, comprising a generally horizontally forwardly extending frame having multiple sections, with pivot structure connecting adjacent sections, so that the sections extend above the infant's seat; a foldable canopy carried by the frame to extend protectively above the seat, and to be folded as the frame sections are relatively pivoted; and support structure connected with the frame and extending generally downwardly to in turn be supported rearwardly of the infant's seat.

13 Claims, 3 Drawing Sheets

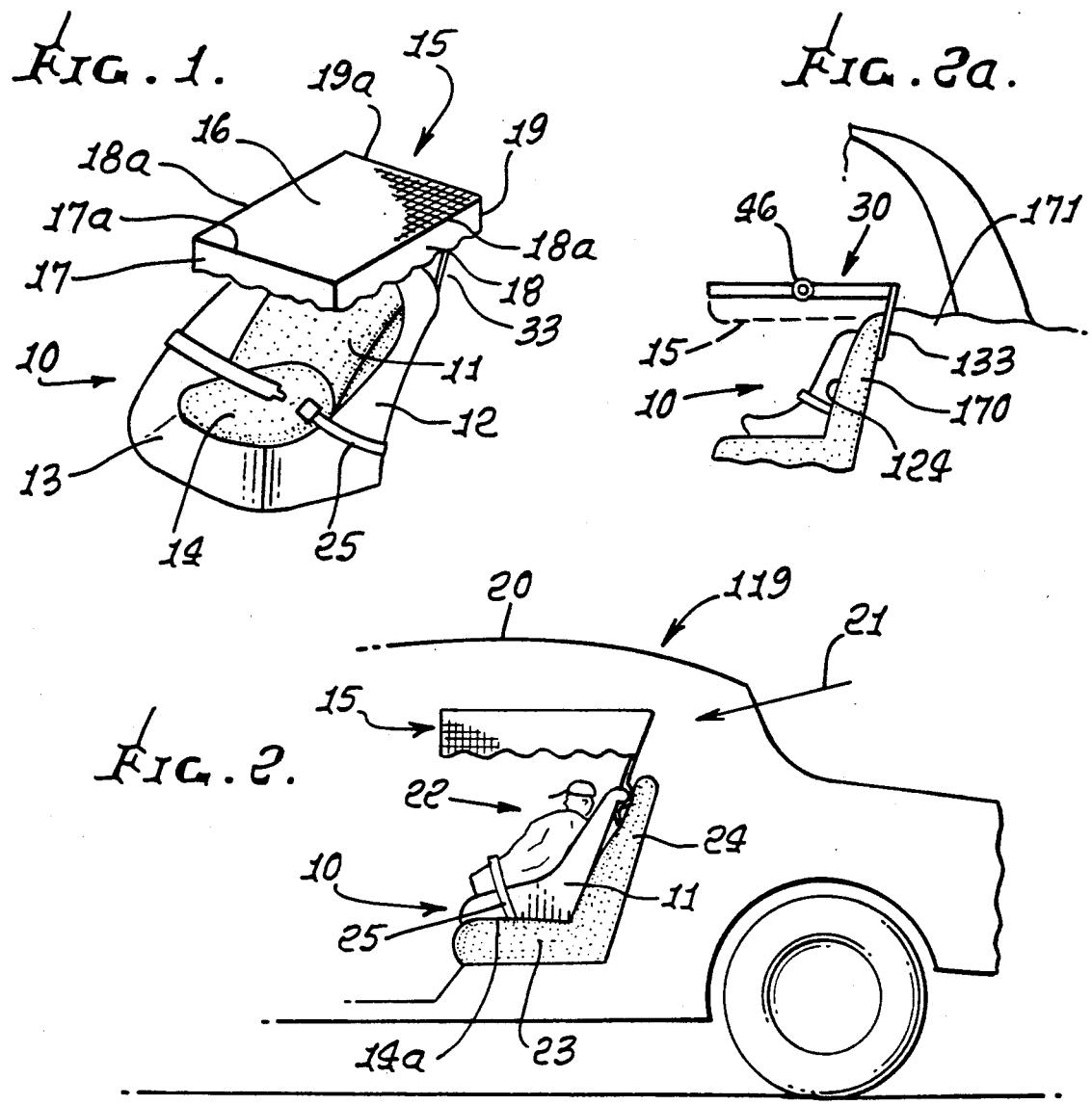

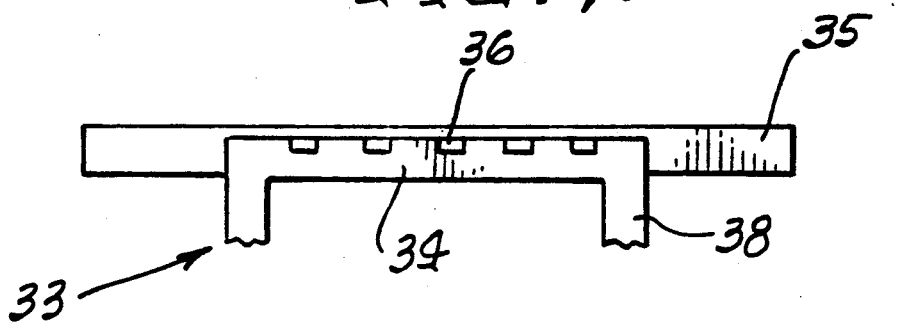
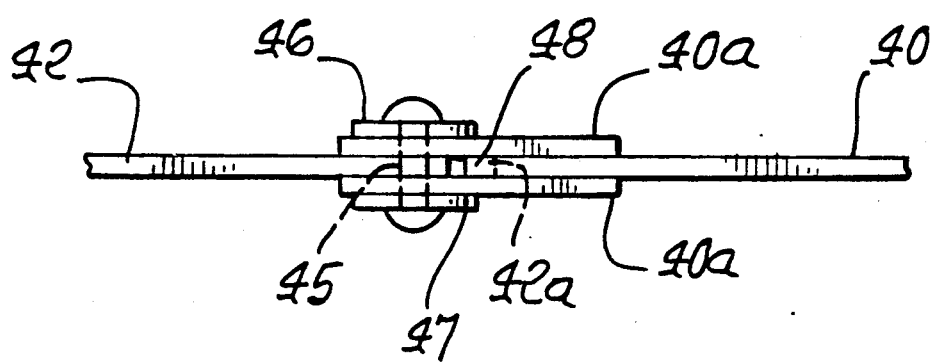
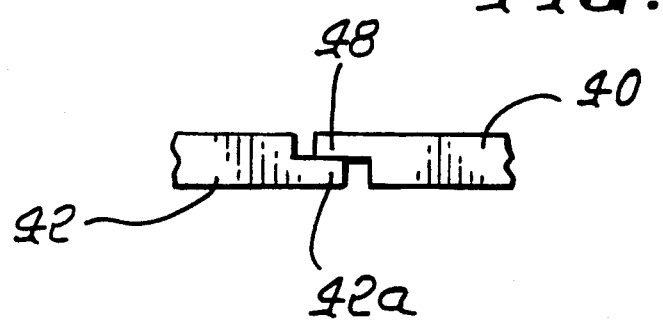

PROTECTION APPARATUS FOR INFANTS

BACKGROUND OF THE INVENTION

This invention relates generally to protection of infants from the sun's rays, and more particularly to providing such protection while the infant is in an infant's seat, as in a vehicle.

There is constant and recognized need to protect the delicate skin and faces of infants from the sun's rays. While it has been thought that when an infant is seated in an infant's seat in a vehicle, such as an automobile, there was protection offered by the vehicle roof against sun impingement on the infant, the fact remains that sunlight passing through the vehicle windows can impinge upon the infant. There is, therefore, need to further protect the infant while it is in the vehicle.

SUMMARY OF THE INVENTION

It is a major object of the invention to provide a lightweight, easily installed, removable protection apparatus for the infant when it is seated in an infant's seat in a vehicle, such as an automobile, for example. Basically, the apparatus comprises:

a) a generally horizontally forwardly extending frame having multiple sections, with pivot means connecting adjacent sections, so that the sections extend above the infant's seat, b) a foldable canopy carried by the frame to extend protectively above the seat, and to be folded as the frame sections are relatively pivoted, c) and support means connected with the frame and extending generally downwardly to in turn be supported rearwardly of the infant's seat.

It is another object to provide such a frame in the form of a first section pivotally carried by the support means, and a first stop shoulder on the support means to limit downward pivoting of the frame relative to the support means at a position in which the first section extends generally horizontally. A second section may also be provided to be pivotally carried by the first section, and a second stop shoulder provided on the first section to limit downward pivoting of the second section relative to the first section at a position in which the second section extends generally horizontally.

Another object is to provide the first frame section to have first and second ends, the first stop shoulder located proximate the first end of the first frame section; and to provide the second section also to have first and second ends, the second stop shoulder located proximate the second end of the first frame section.

A further object is to provide a hinge pivotally connected between the first section and the support means. The first and second sections may be generally rectangular, and the first section may include two longitudinally extending, laterally spaced arms, and at least one cross-piece extending between the two arms; and the second section may also include two longitudinally extending, laterally spaced arms, and at least one cross-piece extending between the two arms.

An additional object is to provide the second stop shoulder in the form of two stop shoulders respectively proximate two pivoted interconnections between the first arms of the sections, and the second arms of the sections, respectively.

Yet another object is to provide the support means to include a support which extends generally downwardly from a rearward portion of the frame, the support angled to connect to one of the following:

i) structure associated with the rear of the infant's seat, ii) vehicle structure at the rear of the infant's seat. That support may have a local channel-shaped connecting portion.

Finally, the second frame section may have an alternate position swung upwardly and rearwardly above the first section, whereby the canopy then only extends part way above or over the infant in the seat; also, the first frame section may have a alternate position swung upwardly and rearwardly above the support means, at which time the second section extends beneath the first section.

These and other objects and advantages of the invention as well as the details of an illustrative embodiment, will be more fully understood from the following specification and drawings, in which:

DRAWING DESCRIPTION

FIG. 1 is a perspective view showing an infant's seat with protection apparatus over same;

FIG. 2 is a side elevation showing the infant's seat within an automobile, together with protection apparatus over the seat;

FIG. 2a is a view like FIG. 2 showing a modification;

FIG. 3 is a perspective view showing a frame structure incorporating the invention;

FIG. 7 is a fragmentary elevation taken on lines 7—7 of FIG. 3;

FIG. 8 is an enlarged plan view taken on lines 8—8 of FIG. 4; and

FIG. 8a is a side elevation showing a stop shoulder.

DETAILED DESCRIPTION

Figure 4:
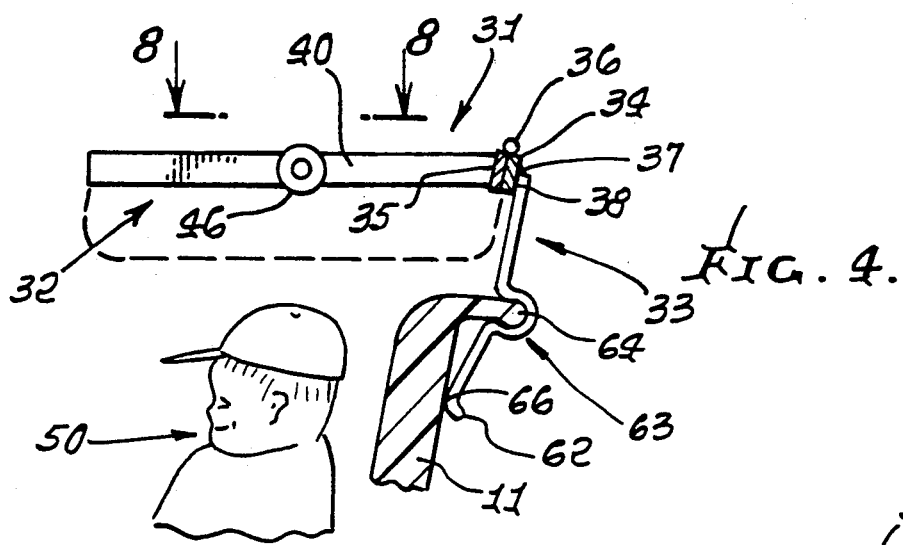
FIG. 4 is a side elevation showing the FIG. 3 frame supported to extend over an infant.

In FIG. 1, an infant's seat or chair 10 has a back 11, arm portions 12, front extent 13, and a seat cushion 14. A canopy 15 extends over the seat or chair, and is supported by a frame structure to be described. The canopy may consist of canvas or other foldable fabric and has a rectangular top 16 which extends generally horizontally, a front portion 17 extending downwardly from the top; side portions 18 extending downwardly from the top and a rear portion 19.

In FIG. 2, the canopy extends as in FIG. 1, but within an automobile 19, immediately below the top 20. The rays 21 of the sun enter through the back window and are interrupted by the canopy 15, as shown, whereby an infant 22 in the seat 10 is protected. The seat bottom 14a may rest upon the rear seat 23 of the automobile; and the infant seat back 11 may rest rearwardly against the automobile seat rear portion 24. A strap is shown at 25 to hold the infant seat in position.

In accordance with the invention, a generally horizontally forwardly extending frame has multiple sections, with pivot means connecting adjacent sections, so that the sections extend above the infant's seat. The multiple section frame is generally rectangular to extend immediately beneath corner portions of the canopy indicated at 18a, 19a and 17a in FIG. 1.

Referring to FIG. 3, the frame 30 includes a first section 31 and a second section 32 extending forwardly of the first section and forming therewith a generally rectangular frame structure. The first section is pivotally carried by a support means 33, which extends generally downwardly to be supported rearwardly of the infant's seat. Referring to FIGS. 4 and 7, a hinge pivotally connects the frame first section 31 to the support means 33. See for example the hinge plate 34 extending immediately rearwardly of the laterally elongated frame part 35, with a hinge pivot 36 at the upper ends of 34 and 35. Plate 34 is suitably connected, as by welding at 37, to the support means at 38. A first stop shoulder is provided, as on the hinge, to limit downward pivoting of the frame relative to the support means, at a position in which the first frame section extends generally horizontally (see FIG. 4) and stop shoulder 39 is at engagement of 34 and 35.

The first frame section is generally U-shaped and has forwardly elongated arms 40 and 41. Those arms are pivotally connected to arms 42 and 43 of the second section 32, which is also U-shaped and includes crosspiece 44 interconnecting the ends of arms 42 and 43. All frame parts may consist of lightweight material, such as aluminum, or plastic material.

FIG. 8 shows one method of providing for such pivoted interconnection, with arm 42 extending between spaced extensions 40a of arm 40. A pivot pin 45 passes through the extensions 40a and the rearward end of arm 42, as well as through guide bearings 46 and 47 at the outer side of extensions 40. A second stop shoulder may be provided on the first section at 48 (at the end of arm 40) to limit downward pivoting of the second section 32 of the frame relative to the first section 31, at a position in which the second section extends generally horizontally. See FIG. 8a. Rearward extension 42a of arm 42 then engages 40 at 48.

Figure 5:
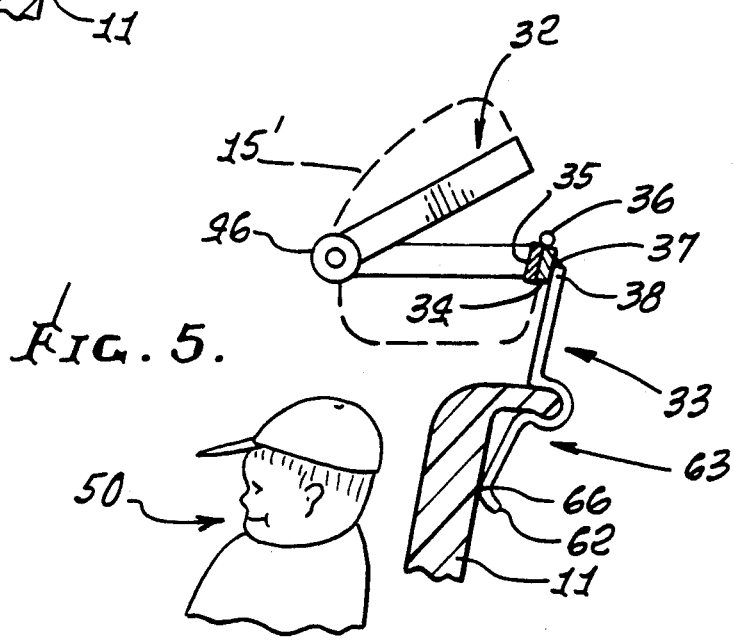
FIG. 5 is a view like FIG. 4 showing partial folding of the frame.
Figure 6:
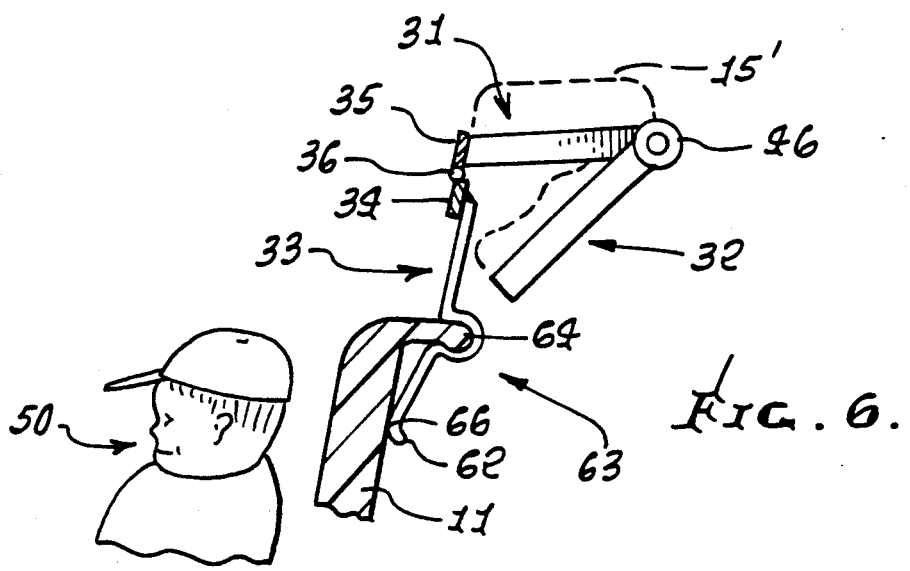
FIG. 6 is an actual view like FIG. 4 showing folding of two frame sections.

Furthermore, the first section has first and second ends, the first stop shoulder located proximate the first end of the first frame section; the second section has first and second ends, the second stop shoulder located proximate the second end of the first frame section. Accordingly, the second frame section has an alternate position swung upwardly and rearwardly above the first section, as seen in FIG. 5, the canopy top also being folded as indicated by broken lines 15', whereby the infant's head 50 is now partly uncovered as well as partly covered. This gives access to the infant, as for its removal from the chair. Furthermore, FIG. 6 shows even further access to the infant, gained by swinging of the first section 31 about the axis of hinge 36, whereby both sections 31 and 32 of the frame now project generally rearwardly and above of the location of the hinge 36, and section 32 is stored beneath section 31. Neither the seat back 11 nor the auto rear seat back 24 interferes with such dual pivoting.

Finally, the support means, as referred to, is connected with the frame and extends downwardly to in turn be supported rearwardly of the infant's seat.

In FIGS. 3 and 4, the support means 33 includes two downwardly extending legs 60 and 61, which are laterally spaced as shown, lower ends of the legs interconnected by a cross-piece 62. Each leg includes a U-shaped bend 63 which opens forwardly to closely receive a ledge portion 64 of the infant's chair, that ledge portion projecting rearwardly. Accordingly, a clamping effect is created whereby the support means 33 is maintained extending generally vertically as shown.

The cross-piece 62 may engage the rear side 66 of the seat.

In FIG. 2a, the modified support means 133 does not include bends, such as at 63; and, the support means legs 160 now extend downwardly within a slot defined between the rear seat 170 of the vehicle and other vehicle structure 171. The infant's seat 10 bears against the rear seat surface 124, as in FIG. 2 at 24. Otherwise, the frame structure is the same as described above.

The frame parts may comprise plastic material, if desired; and they can be covered with soft, compressible plastic or cushioning material.

We claim:

1. In apparatus for protecting an infant in a forwardly facing infant's seat, in a vehicle, from direct exposure to sun rays, the combination comprising:
    a) a generally horizontally forwardly extending frame having multiple frame sections, with pivot means connecting adjacent sections, so that the sections extend above the infant's seat,
    b) a foldable canopy carried by the frame to extend protectively above said seat, and to be folded as the frame sections are relatively pivoted,
    c) and support means connected with the frame and extending generally downwardly to in turn be supported rearwardly of the infant's seat,
    d) said frame including a first section pivotally carried by the support means, and a first stop shoulder on the support means to limit downward pivoting of the frame relative to the support means at a position in which said first section extends generally horizontally,
    e) said frame including a second section pivotally carried by the first section, and a second stop shoulder on the first section to limit downward pivoting of the second section relative to the first section at a position in which the second section extends generally horizontally,
    f) the second frame section having an alternate position swung upwardly and rearwardly of the first section,
    g) the first frame section having an alternate position swung upwardly and rearwardly of the support means, at which time the second section extends beneath the first section,
    h) said support means including a support which extends generally downwardly from a rearward portion of said frame, said support having a channel-shaped connecting portion projecting rearwardly to forwardly interfit with structure at the rear of the infant's seat, and below said first frame section in its alternate rearwardly swung position.

2. The combination of claim 1 including a hinge pivotally connected between the first section and said support means.

3. The combination of claim 1 wherein said first section has first and second ends, the first stop shoulder located proximate said first end of the first frame section.

4. The combination of claim 1 wherein
    i) the first section has first and second ends, the first stop shoulder located proximate said first end of the first frame section, and
    ii) the second section has first and second ends, the second stop shoulder located proximate the second end of the first frame section.

5. The combination of claim 4 wherein each of said sections is generally rectangular and includes two longitudinally extending, laterally spaced arms, and at least one cross-piece extending between said two arms.

6. The combination of claim 5 wherein said second stop shoulder is defined by two stop shoulders respectively proximate two pivoted interconnections between the first arms of said sections, and the second arms of said sections, respectively.

7. The combination of claim 1 wherein said first section is generally rectangular.

8. The combination of claim 7 wherein the second section is generally rectangular.

9. The combination of claim 8 wherein said second section includes two longitudinally extending, laterally spaced arms, and at least one cross-piece extending between said two arms.

10. The combination of claim 7 wherein said first section includes two longitudinally extending, laterally spaced arms, and at least one cross-piece extending between said two arms.

11. The combination of claim 1 wherein said support has legs extending below said channel-shaped portion to engage the rear of the infant's seat.

12. The combination of claim 1 including said infant's seat above which the frame projects forwardly.

13. The combination of claim 1 including said infant's seat and said vehicle structure at the rear of the infant's seat, and interfitting said channel-shaped connecting portion.

* * * * *